US008281833B1

(12) United States Patent
Rumbaugh

(10) Patent No.: US 8,281,833 B1
(45) Date of Patent: Oct. 9, 2012

(54) TIRE ASSEMBLY WITH LOW-FRICTION INTERIOR

(76) Inventor: Gary L. Rumbaugh, Westminster, MD (US)

( * ) Notice: Subject to any disclaimer, the term of this patent is extended or adjusted under 35 U.S.C. 154(b) by 706 days.

(21) Appl. No.: 12/382,668

(22) Filed: Mar. 20, 2009

Related U.S. Application Data

(63) Continuation-in-part of application No. 11/979,256, filed on Oct. 31, 2007, which is a continuation-in-part of application No. 11/071,335, filed on Mar. 4, 2005, now Pat. No. 7,290,577.

(60) Provisional application No. 60/572,754, filed on May 21, 2004, provisional application No. 61/064,700, filed on Mar. 20, 2008.

(51) Int. Cl.
*B60C 5/00* (2006.01)
*B60B 21/00* (2006.01)
*B60B 19/08* (2006.01)

(52) U.S. Cl. ...................................... 152/450; 301/10.1

(58) Field of Classification Search ........................ None
See application file for complete search history.

(56) References Cited

U.S. PATENT DOCUMENTS

| | | | | |
|---|---|---|---|---|
| 2,040,645 | A * | 5/1936 | Dickinson | 152/158 |
| 4,003,419 | A * | 1/1977 | Verdier | 152/312 |
| 4,037,636 | A * | 7/1977 | Hagenbohmer et al. | 152/504 |
| 4,212,339 | A * | 7/1980 | Dobson | 152/158 |
| 4,340,104 | A * | 7/1982 | Kuan | 152/521 |
| 2003/0230369 | A1 * | 12/2003 | Domer et al. | 152/504 |

FOREIGN PATENT DOCUMENTS

| | | |
|---|---|---|
| DE | 3617381 | * 11/1987 |
| FR | 2195534 | * 3/1974 |

OTHER PUBLICATIONS

English Language Machine Translation of FR 2195534, 1974.*
English Language Machine Translation of DE 3617381, 1987.*

* cited by examiner

*Primary Examiner* — Justin Fischer
*Assistant Examiner* — Philip N Schwartz
(74) *Attorney, Agent, or Firm* — Andrews Kurth LLP; Aldo Noto; Michael Ye

(57) ABSTRACT

A pneumatic tire assembly is disclosed. The tire assembly includes a tire body having an interior surface covered with a low-friction material and a tire rim having an interior surface. The tire body is attached to the tire rim such that the interior surface of the tire body and the interior surface of the tire rim define an inner space of the pneumatic tire assembly. The inner space is filled with a gas and the covering of the low-friction material reduces friction between the gas and the interior surface of the tire body.

10 Claims, 6 Drawing Sheets

100
11
20
21
40
50
12
30
10

TIRE ASSEMBLY WITH LOW-FRICTION INTERIOR

RELATED APPLICATIONS

This application is a continuation-in-part of U.S. patent application Ser. No. 11/979,256, filed Oct. 31, 2007, which is a continuation-in-part of U.S. patent application Ser. No. 11/071,335, filed Mar. 4, 2005, now U.S. Pat. No. 7,290,577 which claims priority of U.S. Provisional Application No. 60/572,754, filed May 21, 2004, all of which are hereby incorporated by reference in their entirety. This application also claims priority of U.S. Provisional Application No. 61/064,700, filed Mar. 20, 2008, which is hereby incorporated by reference in its entirety.

TECHNICAL FIELD

The present teachings relate to improved pneumatic tires and, in particular, to pneumatic tires with reduced internal air friction.

BACKGROUND OF THE INVENTION

Conventional tires used for transportation, bicycles, or other recreational vehicles and the like generate considerable friction when the tire is in motion. Some of this friction is caused by the flow of air inside an air filled tire.

For example, when a hollow air filled tire rotates, the air inside the tire rotates or flows in a direction opposite the direction of motion. As a result, significant friction is generated within the tire. This friction can cause drag opposite the direction of motion. This drag in turn reduces the efficiency of the tire. The friction also generates heat inside the tire and reduces the useful life of the tire.

SUMMARY

A pneumatic tire assembly is disclosed. The tire assembly includes a tire body having an interior surface covered with a low-friction material and a tire rim having an interior surface. The tire body is attached to the tire rim such that the interior surface of the tire body and the interior surface of the tire rim define an inner space of the pneumatic tire assembly. The inner space is filled with a gas and the covering of the low-friction material reduces friction between the gas and the interior surface of the tire body.

In one embodiment, the interior surfaces of the tire body and the tire rim have an undulant shape and are configured so that undulations on the interior surface of the tire body match undulations on the interior surface of the tire rim to form air pockets inside the tire assembly.

Also disclosed is a pneumatic tire body for a pneumatic tire assembly having a tire body mounted on a tire rim. The tire body comprises an interior surface that, together with an interior surface of the tire rim, defines an inner space of the pneumatic tire assembly. The interior surface of the tire body is covered with a low-friction coating material. The covering of the low-friction material reduces friction between a gas located in the inner space and the interior surface of the pneumatic tire body.

Also disclosed is a rim for a pneumatic tire. The rim has a substantially circular rim body with an interior surface that faces an inside space of the pneumatic tire. The interior surface of the rim has an undulant shape with undulations extending from one side of the rim to an opposing side of the rim, in directions parallel to a rotation axis of the rim.

BRIEF DESCRIPTION OF THE DRAWINGS

Embodiments of the present invention are illustrated by way of example, and not limitation, in the accompanying figures in which like references may denote similar elements or different elements, and in which.

DETAILED DESCRIPTION

Figure 1:
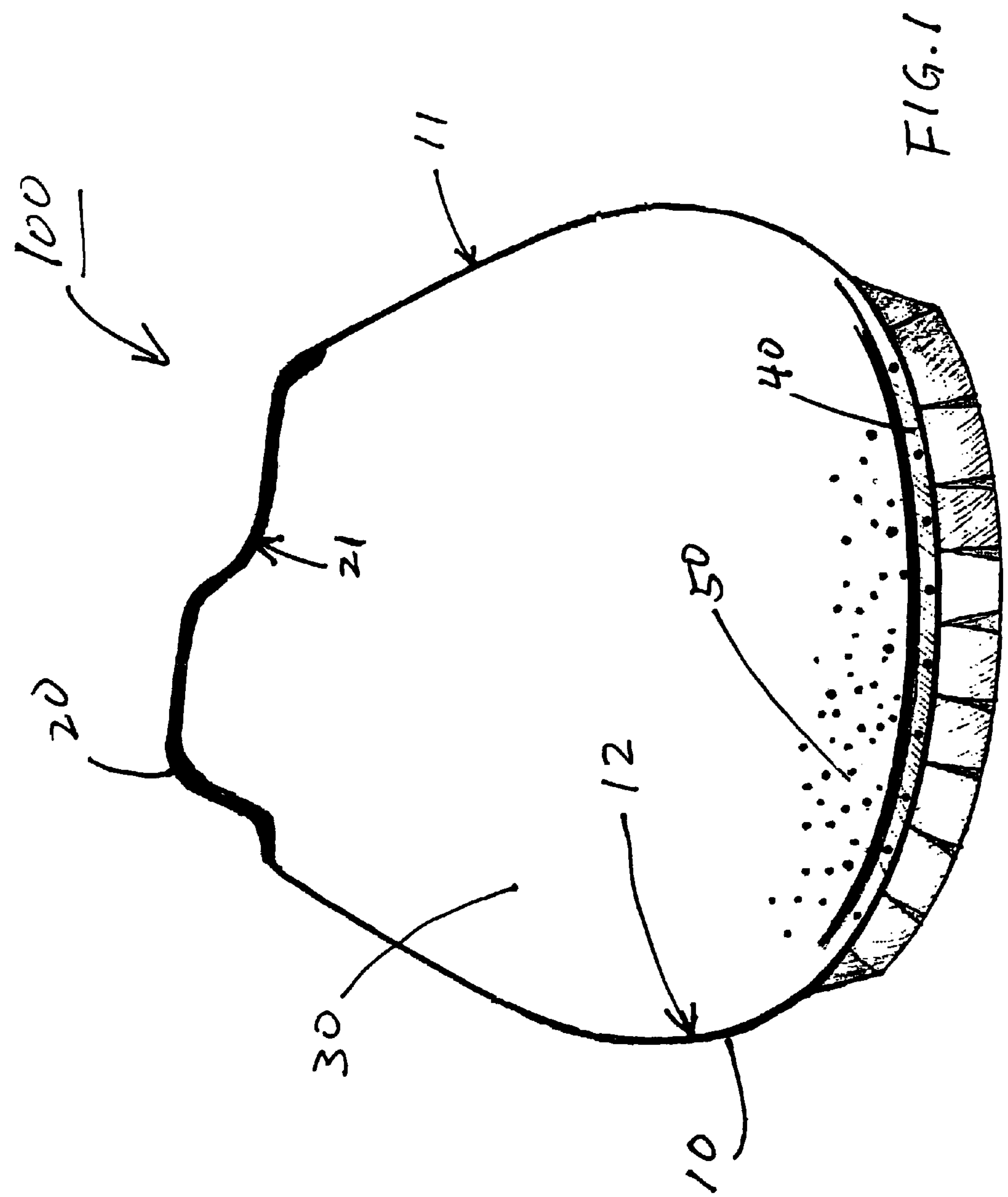
FIG. 1 is a diagram showing a cross-section of a tire having an interior covered with a low-friction layer.

A pneumatic tire with a low-friction interior is disclosed. FIG. 1 shows the cross section of an embodiment of a pneumatic tire with a low-friction interior. In this embodiment, the pneumatic tire assembly 100 includes a substantially circular tire body 10 and a matching rim 20. The tire body 10 has an exterior surface 11, and an interior surface 12. The rim 20 has an interior surface 21 that defines an inner tire space 30 with the interior surface 12 of the tire body 10. The inner space 30 is typically filled with a gas, such as air. The interior surface 12 of the tire body 10 is covered with a low-friction layer 40 to reduce friction between air inside the inner tire space 30 and the interior surface 12 of the tire body 10. The tire body 10 is typically made from rubber or rubber-like materials.

The term “low-friction layer” or “low-friction surface” refers to a layer or a surface with a friction coefficient that is significantly lower than that of the interior surface of a conventional tire. The term “low-friction layer” or “low-friction surface,” as used herein, also includes a layer of material with a surface that is visibly smoother and slicker than the interior surface of a conventional tire. A surface that is covered with a layer of gloss or high gloss paint, or any commercial off-the-shelf low friction coating, friction reduction coating, or anti-friction coating (AFCs) is considered a low-friction surface of the present teaching.

The low-friction layer 40 can be formed with any material that adheres to the tire body 10 and forms a smooth, slick, or slippery surface inside the tire. Preferably, the low-friction layer 40 forms a durable, abrasion resistant, slippery surface with low surface energy in the interior of the tire assembly 100.

In one embodiment, the low-friction layer 40 is formed with a commercially available low friction coating, friction reduction coating, anti-friction coating (AFCs), or a gloss/high gloss paint. These coatings can be applied by conventional painting techniques, for example, by spraying, dipping, or brushing. Other application techniques may also be used.

The low-friction layer 40 may include various polymeric resins such as polyurethanes for high abrasion resistance, polyesters for weatherability, and silicones and fluoropolymers (such as TEFLON) for low friction resistance. Other examples of durable structural coating class of resins include, but are not limited to, acrylics, epoxies, vinyl acrylics, styrene butadienes, ureas, polyurea, and silicates. The low-friction layer 40 may further contain a solid lubricant such as molybdenum disulfide, graphite, and PTFE.

In one embodiment, the low-friction layer 40 is formed with a solvent-free urethane coating containing a liquid-type agent such as a silicone oil (dimethyl polysiloxane) or a solid-type agent such as TEFLON resin powder, molybdenum disulfide, boron nitride, tungsten disulfide or fluorinated graphite.

In another embodiment, the low-friction layer 40 comprises a graphite-filled polyurethane enamel as described in U.S. Pat. No. 4,694,038, which is hereby incorporated by reference.

In another embodiment, the low-friction layer 40 comprises a vinyl flex paint with a gloss finish.

In other embodiments, the low-friction layer 40 comprises one or more of the following: carnauba wax, petroleum distillates, alkyd resin, titanium dioxide, naptha, and methyl ethyl ketoxine.

In another embodiment, the low-friction layer 40 is a vulcanized layer.

In another embodiment, the low-friction layer 40 is formed by covering the interior the tire body 10 with a rubber or rubber-like texture having a smooth surface and, optionally, further coating the smooth texture surface with a layer of low-friction coating, such as a commercially available low friction coating, friction reduction coating, anti-friction coating (AFCs), or a gloss/high gloss paint.

In another embodiment, the low-friction interior is formed by polishing the interior of the tire body 10. The polished surface may be further covered with a low-friction coating, such as a commercially available low friction coating, friction reduction coating, anti-friction coating (AFCs), or a gloss/high gloss paint.

In certain embodiments, the low-friction layer 40 has a thickness of 10 mm or less. In other embodiments, the low-friction layer 40 has a thickness of 5 mm or less. In yet other embodiments, the low-friction layer 40 has a thickness of 3 mm or less.

Figure 2:
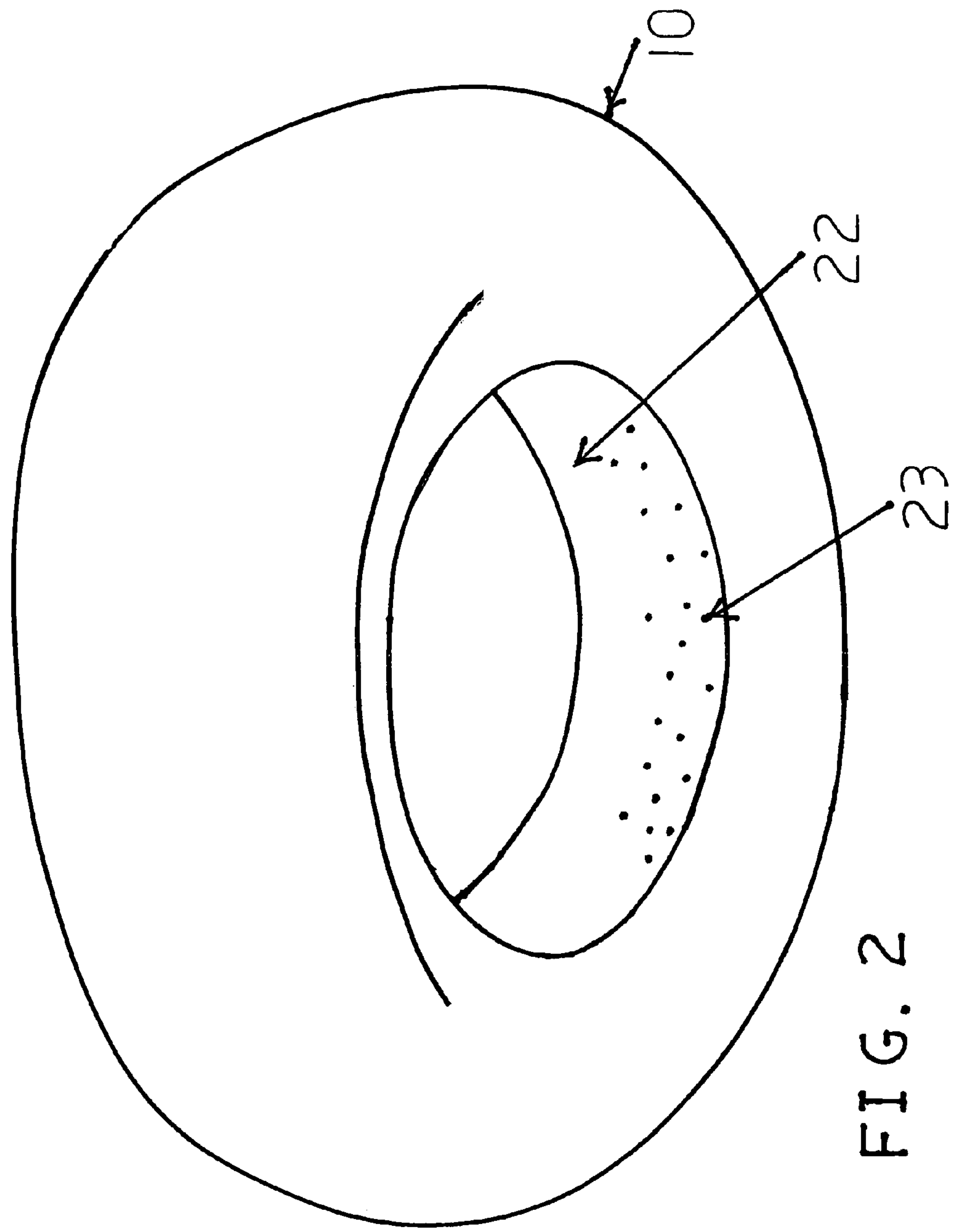
FIG. 2 is a picture of a tire body showing the painted smooth interior and graphite crystals inside the tire casing.

Referring again to FIG. 1, the tire assembly 100 may further include a free-moving solid lubricant 50 in the inner tire space 30. The solid lubricant 50 is a fine powder of a soft, inert material with low chemical reactivity and conductivity. Examples of solid lubricant 50 include, but are not limited to, graphite crystals, powders of graphite crystals, talcum powders and combinations thereof. The solid lubricant 50 is used in an amount sufficient to form a thin layer on the low-friction layer 40 to further reduce the friction between the layer 40 and the air trapped inside the tire. The exact amount is application dependent and can be determined by a person of ordinary skill in the art. In one embodiment, 0.5-10 grams of the solid lubricant 50 are placed into the inner space of a standard size car tire. FIG. 2 shows a tire body 10 with a low-friction interior painted with a commercial off-the-shelf gloss paint 22 and the black graphite crystals 23 inside the tire casing.

Figure 3:
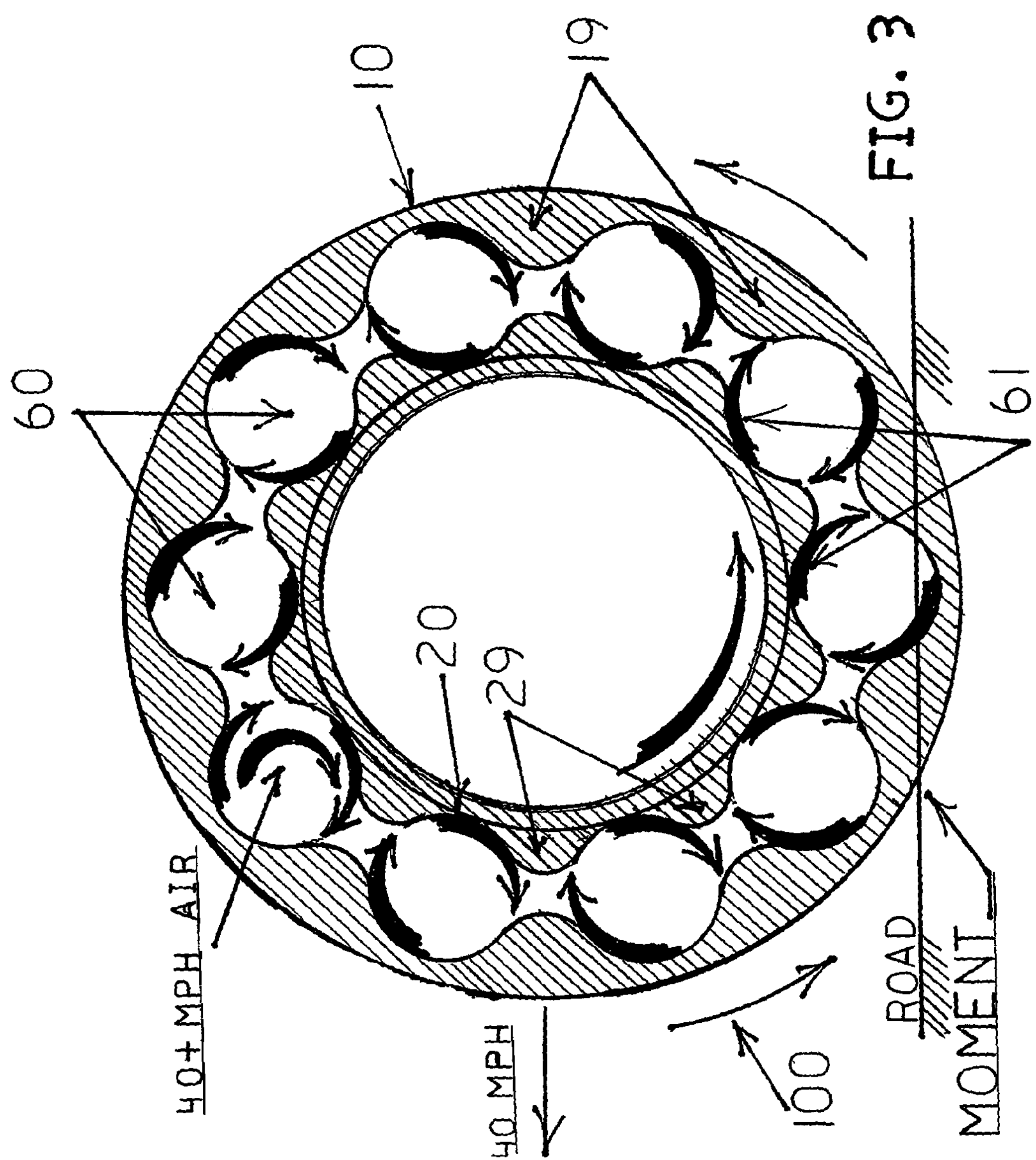
FIG. 3 is a diagram showing a tire assembly with undulated interior surfaces and air flow pattern inside the tire assembly.
Figure 4:
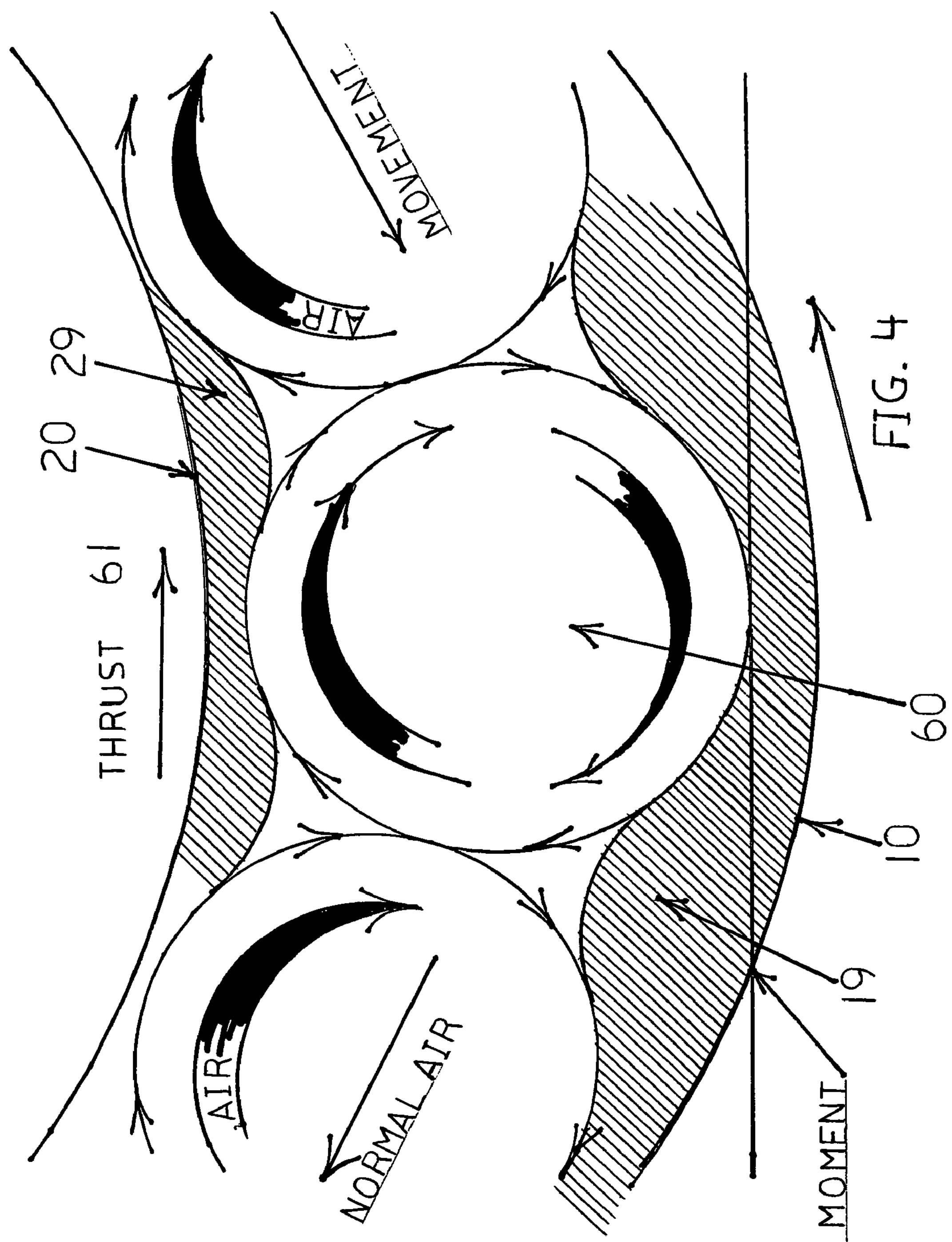
FIG. 4 is a close-up view of an air pocket. diagram showing of a wheel and rim.

Referring now to FIG. 3, in an embodiment, the interior surfaces of the tire body 10 and the rim 20 may have matching undulant shapes so that the inner tire space is divided into multiple interconnecting air pockets 60. As shown in FIGS. 3 and 4, when the tire assembly 100 rotates, the air inside the tire would rotate in each air pocket 60 in the direction opposite to the direction of tire rotation. For example, if the tire assembly 100 is rotating in a clockwise direction, the air inside the tire assembly 100 would rotate in the counter-clock direction. The rotation direction of the internal air is in part caused by the weight of a vehicle or the like which causes a deflection where the tire assembly 100 contacts the road surface. The resulting force moment initiates the rotation of the air inside the air pockets 60. In theory, the air inside the air pockets 60 would move at the same speed as the rotating speed of the tire, but in the opposite direction. The rotating air inside each air pocket 60 generates a thrust 61 on the undulations 19 and 29 in the same direction as the rotation direction of the tire assembly 100.

Figure 5:
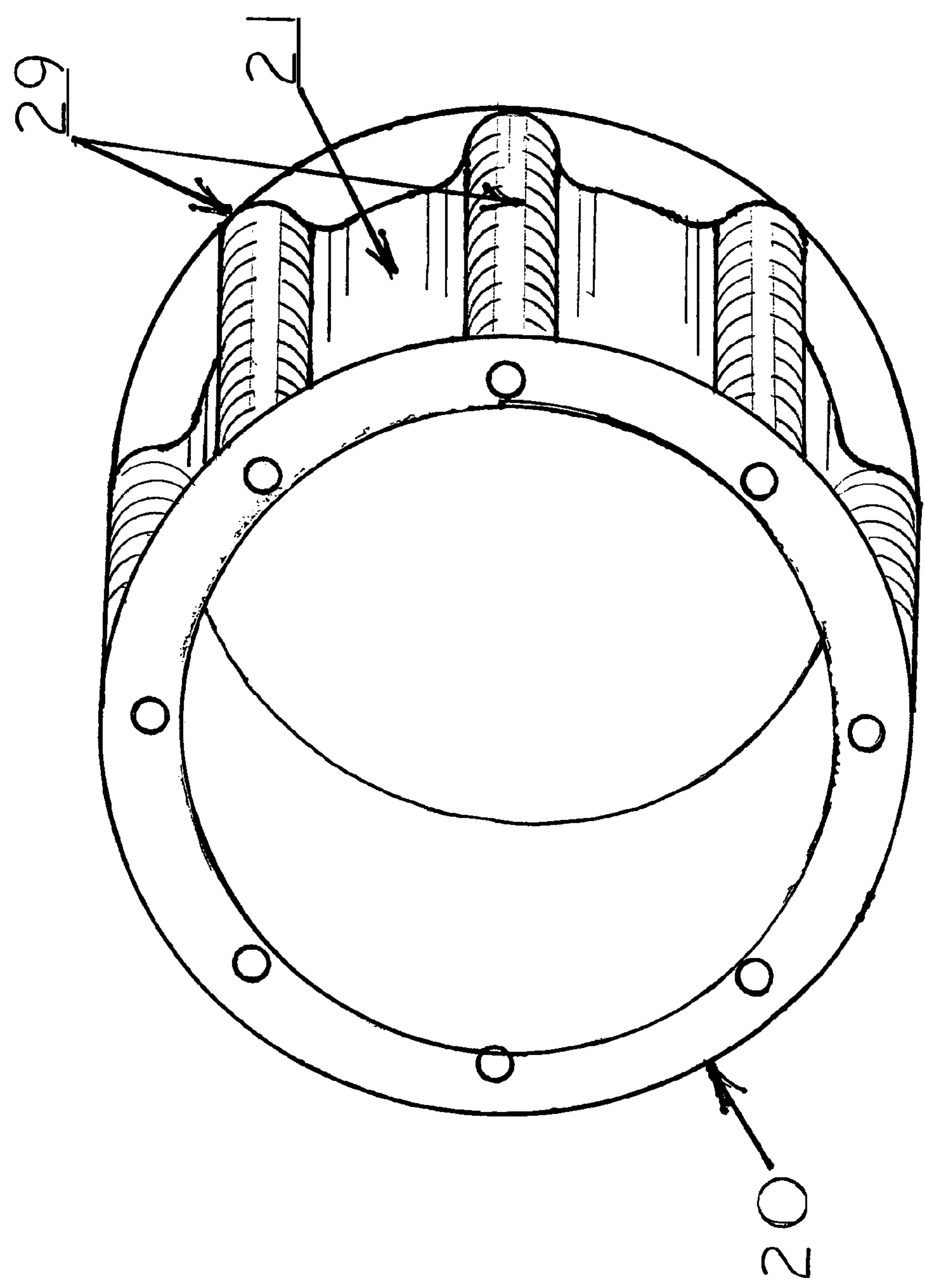
FIG. 5 is a diagram showing an undulating surface of a tire rim milled from one piece of aluminum.
Figure 6:
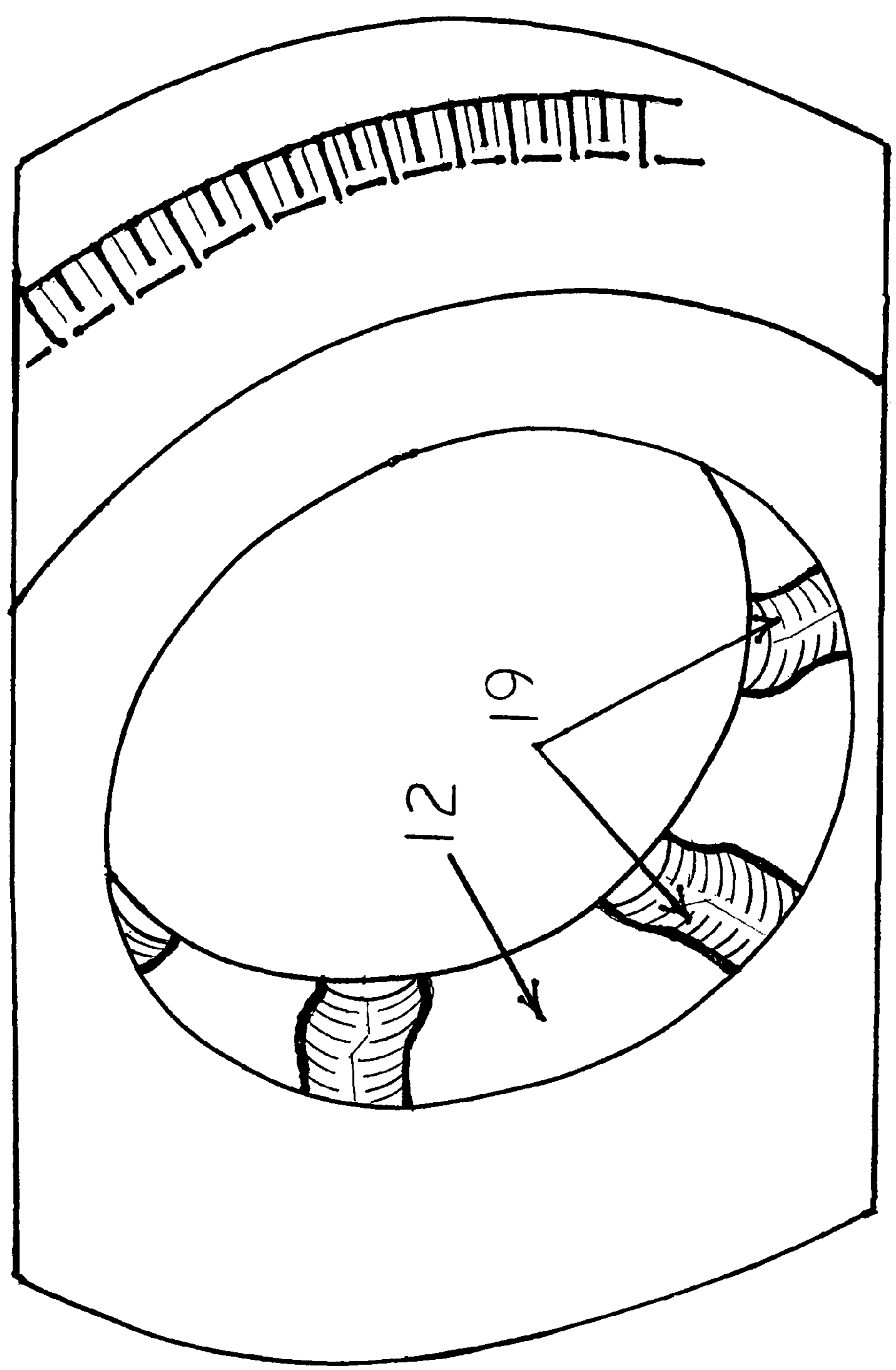
FIG. 6 is a picture of a tire body with an undulated interior surface covered with a low-friction paint.

FIG. 5 shows an embodiment of a tire rim 20 with an undulated interior surface 21 and undulations 29. FIG. 6 shows an embodiment of a tire body 10 with an undulated interior surface 12 covered with a low-friction paint and undulations 19. As shown in FIGS. 3-6, the undulations 19 and 29 on the interior surface of the tire body and tire rim, respectively, extend from one side of the tire to an opposing side of the tire, in directions parallel to the rotation axis of the tire.

The undulations 19 and 29 may be formed during the molding process of the tire body 10 and rim 20, and then covered with a layer of low-friction material. The undulations may also be formed by attaching an undulating layer or individual undulations to the interior surfaces of the tire body 10 or rim 20. The undulating layer or undulations may be made of any type of materials, such as a plastic, rubber, metals, alloys, or any combination thereof. The undulating layer or individual undulations may be made of a flexible, semi-flexible rigid or rigid material. If not formed by molding, the undulating layer or individual undulations may be attached to the interior surfaces of the tire body 10 and rim 20 using, for example, contact cement, glue, welds, staples, nails, and/or by any other means.

A smooth and slippery interior surface reduces air friction and hence heat generated inside a tire, which in turn improves gas mileage and extends the useful life of the tire. In the case of tires with undulated interior surfaces, the additional thrust generated by the undulations inside the tire may further the gas mileage and/or performance of the vehicle equipped with such tires. Also, undulating tires prevent air from flowing all through inner circumference of tire, such airflow builds moment and increases drag or friction inside the tire Embodiments of the present teachings can significantly reduce overall fuel consumption of the vehicle using tires as described herein. In certain embodiments, the overall fuel consumption is reduced by 5%, 10% 15%, 20%, 25% or 30%. Embodiments of the present teachings can be used in all types of vehicles or the like, including cars, trucks (e.g., 18 wheelers, etc), buses, vans, bicycles, motorcycles, golf-carts, military vehicles, or other types of transportation and/or recreational vehicles or the like.

Also disclosed is a pneumatic tire body for a pneumatic tire assembly having a tire body mounted on a tire rim. The pneumatic tire body has an interior surface that, together with an interior surface of the tire rim, defines an inner space of the pneumatic tire assembly. The interior surface of the pneumatic tire body is covered with a low-friction coating material that reduces friction between a gas located in the inner space and the interior surface of the pneumatic tire body.

In one embodiment, the low-friction interior surface is formed by covering the interior surface of the tire body with a layer of low-friction coating material. In another embodiment, the low-friction interior surface is formed by polishing the interior of the tire body. In another embodiment, the low-friction interior surface is formed by polishing the interior of the tire body and then covering the polished surface with a low-friction coating. In another embodiment, the low-friction interior surface is formed by covering the interior the tire body with a rubber texture having a smooth surface and, optionally, further coating the smooth texture surface with a layer of low-friction coating. In yet another embodiment, the interior surface has an undulant shape.

Also disclosed is a rim for a pneumatic tire. The rim has a substantially circular rim body with an interior surface having undulations extending from one side of the rim to an opposing side of the rim in directions parallel to the rotation axis of the rim. The interior surface of the rim is the surface that faces the tire body and defines the tire inner space with the interior surface of the tire body in a tire assembly. In one embodiment, the rim is milled from one piece of aluminum.

EXAMPLES

Example 1

Tires with a Painted Interior Significantly Improve Gas Mileage of a Vehicle Tires with or without a painted interior were tested on a 1988 Jeep under various weather conditions. The average gas mileage of the Jeep was 18.67 miles per gallon (mpg) with a set of four regular tires. The interior surface of the regular tires were then spray painted with a vinyl flex gloss paint (5 oz per tire). 3-4 grams of graphite crystals were also added into the inner space of each tire. The painted and graphite-containing tires were put back onto the same Jeep. The average gas mileage of the Jeep with the painted and graphite-containing tire averaged at 22.63 mpg, an over 20% increase from the gas mileage of the same vehicle with regular, unpainted tires.

Several embodiments and examples of the present teachings are specifically illustrated and/or described herein. However, it will be appreciated that modifications and variations of the present invention are covered by the above teachings without departing from the spirit and intended scope of the invention.

What is claimed is:

1. A pneumatic tire assembly, comprising:

a tire body having an interior surface covered with a low-friction material; and a tire rim having an interior surface, wherein said tire body is attached to said rim such that said interior surface of said tire body and said interior surface of said rim define an inner space of said pneumatic tire assembly, wherein said inner space is filled with a gas, wherein said covering of said low-friction material reduces friction between said gas and said interior surface of said tire body;

wherein said interior surfaces of said tire body and said tire rim have an undulant shape and are configured so that undulations on said interior surface of said tire body match undulations on said interior surface of said tire rim to form air pockets inside said tire assembly; and wherein the undulations on the said interior surface of said tire body have an antiparallel configuration relative to the undulation on said interior surface of said tire rim, whereupon rotation of the tire assembly produces air rotating in the said air pockets opposite to the direction of tire rotation, and wherein the rotating air inside each air pocket generates a thrust on the undulations in the same direction as the rotation direction of the tire assembly.

2. The pneumatic tire assembly of claim 1, wherein said low-friction material comprises a polymeric resin selected from the group consisting of polyurethanes, polyesters, fluoropolymers, acrylics, epoxies, vinyl acrylics, styrene butadienes, polyurea, and silicones, silicates.

3. The pneumatic tire assembly of claim 1, wherein said low-friction material comprises one or more materials selected from the group consisting of carnauba wax, petroleum distillates, alkyd resin, titanium dioxide, naptha, and methyl ethyl ketoxine.

4. The pneumatic tire assembly of claim 1, wherein said low-friction material comprises a commercial off-the-shelf low friction coating, friction reduction coating, or anti-friction coating.

5. The pneumatic tire assembly of claim 1, wherein said low-friction material comprises a commercial off-the-shelf gloss or high gloss paint.

6. The pneumatic tire assembly of claim 1, wherein said interior surface of said tire body is covered with a rubber or rubber-like texture having a smooth surface, and wherein said smooth surface is covered with a low-friction material.

7. The pneumatic tire assembly of claim 1, wherein said low-friction material forms a low-friction layer on said interior surface and said low-friction layer has a thickness of less than 10 mm.

8. The pneumatic tire assembly of claim 1, further comprising a free-moving solid lubricant inside said inner space.

9. The pneumatic tire assembly of claim 8, wherein said solid lubricant is selected from the group consisting of graphite crystals, graphite powders, talcum powders and combinations thereof.

10. The pneumatic tire assembly of claim 1, wherein said undulations on said interior surfaces of said tire and said tire rim extend from one side of said tire assembly to an opposing side of said tire assembly in directions parallel to a rotation axis of said tire assembly.

* * * * *